(12) United States Patent
Liu

(10) Patent No.: US 11,227,533 B2
(45) Date of Patent: Jan. 18, 2022

(54) AMBIENT LIGHT COLLECTING METHOD AND APPARATUS, TERMINAL AND STORAGE MEDIUM

(71) Applicant: BEIJING XIAOMI MOBILE SOFTWARE CO., LTD., Beijing (CN)

(72) Inventor: Gaosen Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/686,147

(22) Filed: Nov. 17, 2019

(65) Prior Publication Data

US 2021/0012702 A1    Jan. 14, 2021

(30) Foreign Application Priority Data

Jul. 8, 2019    (CN) .......................... 201910611827.9

(51) Int. Cl.
    *G09G 3/22* (2006.01)
    *H04M 1/725* (2021.01)
    *H04M 1/72454* (2021.01)

(52) U.S. Cl.
    CPC .......... *G09G 3/22* (2013.01); *H04M 1/72454* (2021.01); *G09G 2360/141* (2013.01); *G09G 2360/144* (2013.01); *H04M 2201/38* (2013.01)

(58) Field of Classification Search
    CPC ................ G09G 3/22; G09G 2360/144; G09G 2320/0626; G09G 2320/0666; G09G 2320/0686; G09G 2360/141; G09G 3/2092; G09G 5/003; H04M 1/72569; H04M 1/72454; H04M 2201/38
    See application file for complete search history.

(56) References Cited

U.S. PATENT DOCUMENTS

| 6,271,813 B1 * | 8/2001 | Palalau | ................... H04N 5/58 |
| | | | 345/207 |
| 9,345,103 B1 * | 5/2016 | Letourneur | ............ H05B 45/10 |

(Continued)

FOREIGN PATENT DOCUMENTS

| CN | 103714790 A | 4/2014 |
| CN | 107665698 A | 2/2018 |

(Continued)

OTHER PUBLICATIONS

Extended European search report of counterpart EP application No. 20156548.8 dated May 12, 2020.

(Continued)

*Primary Examiner* — Afroza Chowdhury
(74) *Attorney, Agent, or Firm* — Syncoda LLC; Feng Ma

(57) ABSTRACT

A method of collecting ambient light is employed by a terminal provided with an ambient light sensor at a first area in a display screen of the terminal. The method includes: determining a target image frame adjacent to a collection time point, wherein the collection time point is a time point at which the ambient light sensor collects ambient light; decreasing display brightness of pixel points in a second area of the target image frame to a target value, wherein the first area is a sub-area of the second area; and displaying the target image frame according to the target value, and controlling the ambient light sensor to collect the ambient light at the collection time point.

18 Claims, 4 Drawing Sheets

(56) References Cited

U.S. PATENT DOCUMENTS

| | | | |
|---|---|---|---|
| 9,564,104 B1* | 2/2017 | Letourneur | G09G 3/344 |
| 9,911,395 B1* | 3/2018 | Townsend | G09G 5/10 |
| 10,140,909 B2* | 11/2018 | Wang | G09G 3/2074 |
| 10,564,774 B1* | 2/2020 | Chang | G09G 3/3208 |
| 2002/0118182 A1* | 8/2002 | Luther Weindorf | G09G 3/3406 345/204 |
| 2003/0095397 A1* | 5/2003 | McGowan | G02F 1/1336 362/23.02 |
| 2005/0184952 A1* | 8/2005 | Konno | G09G 3/3648 345/102 |
| 2006/0132400 A1* | 6/2006 | Cok | G09G 3/3208 345/81 |
| 2006/0256093 A1* | 11/2006 | Furukawa | G06F 3/0412 345/173 |
| 2007/0035489 A1* | 2/2007 | Lee | G09G 3/3233 345/77 |
| 2007/0205999 A1* | 9/2007 | Akimoto | G09G 3/3648 345/207 |
| 2008/0055228 A1* | 3/2008 | Glen | G09G 5/10 345/102 |
| 2008/0165116 A1* | 7/2008 | Herz | G09G 3/3406 345/102 |
| 2009/0179880 A1* | 7/2009 | Nakajima | G09G 3/3406 345/207 |
| 2009/0195497 A1* | 8/2009 | Fitzgerald | G06F 3/0346 345/156 |
| 2009/0237381 A1* | 9/2009 | Otani | G02F 1/1362 345/207 |
| 2010/0220048 A1* | 9/2010 | Yamamura | G09G 3/3426 345/102 |
| 2010/0225617 A1* | 9/2010 | Yoshimoto | G06F 3/042 345/175 |
| 2011/0069050 A1* | 3/2011 | Sirmon | H05K 1/142 345/207 |
| 2014/0132158 A1* | 5/2014 | Land | G09G 3/20 315/152 |
| 2014/0166850 A1* | 6/2014 | Zheng | G09G 3/3406 250/205 |
| 2014/0365965 A1* | 12/2014 | Bray | G01C 21/3632 715/810 |
| 2015/0070337 A1* | 3/2015 | Bell | G09G 3/007 345/207 |
| 2017/0220838 A1* | 8/2017 | He | G06F 3/0412 |
| 2018/0074199 A1* | 3/2018 | Lin | G01S 17/36 |
| 2018/0075798 A1* | 3/2018 | Nho | G09G 3/3233 |
| 2018/0196931 A1* | 7/2018 | Cho | G06F 21/32 |
| 2018/0260602 A1* | 9/2018 | He | G06F 21/83 |
| 2019/0304380 A1* | 10/2019 | Kang | G09G 3/3413 |

FOREIGN PATENT DOCUMENTS

| | | |
|---|---|---|
| CN | 107818753 A | 3/2018 |
| CN | 107979698 A | 5/2018 |
| CN | 107990978 A | 5/2018 |
| EP | 3550551 A2 | 10/2019 |
| WO | 2019128250 A1 | 7/2019 |

OTHER PUBLICATIONS

First office action of Chinese application No. 201910611827.9 dated Sep. 18, 2021.

* cited by examiner

AMBIENT LIGHT COLLECTING METHOD AND APPARATUS, TERMINAL AND STORAGE MEDIUM

CROSS-REFERENCE TO RELATED APPLICATION

This application claims priority to Chinese Patent Application 201910611827.9 filed on Jul. 8, 2019, the disclosure of which is hereby incorporated by reference in its entirety.

BACKGROUND

An ambient light sensor is provided on a typical mobile terminal (such as a smart phone or a tablet) to collect the light intensity in the environment. The display brightness and image capturing parameters of the display screen can then be adjusted according to the light intensity.

SUMMARY

The present disclosure relates generally to the field of displays, and more specifically to an ambient light collecting method and apparatus, a terminal, and a storage medium.

Embodiments of the present disclosure provide an ambient light collecting method, a terminal, and a storage medium.

According to a first aspect of the present disclosure, there is provided an ambient light collecting method, applied to a terminal provided with an ambient light sensor, the said ambient light sensor being disposed in a first area in a display screen of the terminal. The method comprises:

determining a target image frame adjacent to a collection time point, wherein the collection time point is a time point at which the ambient light sensor collects ambient light;

decreasing display brightness of pixel points in a second area of the target image frame to a target value, wherein the first area is a sub-area of the second area; and displaying the target image frame according to the target value, and controlling the ambient light sensor to collect the ambient light at the collection time point.

According to another aspect of the present disclosure, there is provided a terminal, comprising: a processor and a memory, wherein a computer program is stored in the memory, and the processor executes the computer program to implement the ambient light collecting method in the above aspect.

According to yet another aspect of the present disclosure, there is provided a computer readable storage medium, wherein the computer readable storage medium stores a computer program, the computer program being executed by a processor to implement the ambient light collecting method in the above aspect.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Explanation will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of devices and methods consistent with aspects related to the disclosure as recited in the appended claims.

Many mobile terminals adopt a full screen design. A full liquid crystal display (LCD) or organic light-emitting diode (OLED) screen is placed on the front panel of the mobile terminal to provide a screen ratio as high as possible. In a mobile terminal adopting a full screen design, a hole may be provided in the liquid crystal display screen, and an ambient light sensor is disposed in the hole.

In the above solution, the screen light emitted by the liquid crystal display around the hole in the display screen may affect the collection accuracy of the ambient light sensor.

In various embodiments of the present disclosure, by determining a target image frame adjacent to a collection time point and decreasing display brightness of pixel points in a second area of the target image frame to a target value, the display brightness of the pixel points in the second area can be decreased as much as possible, thereby reducing or eliminating the influence of the display light emitted by the pixel points in the second area on the ambient light sensor when collecting ambient light.

Figure 1:
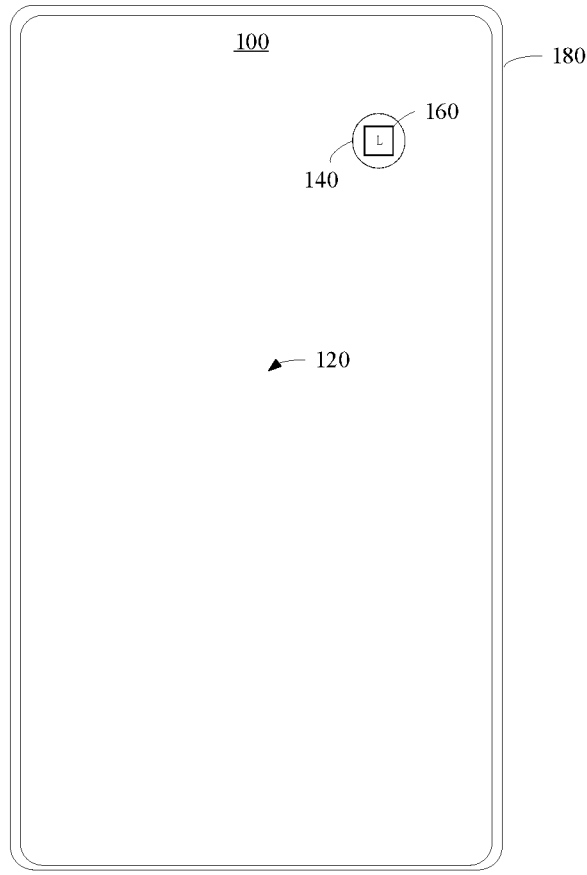
FIG. 1 is a schematic diagram of a mobile terminal according to some embodiments.

FIG. 1 is a block diagram of a mobile terminal 100 shown in some embodiments of the present application. The mobile terminal 100 includes a display screen 120 and an ambient light sensor 160 located in a first area 140 of the display screen 120 (or below the first area 140).

The mobile terminal 100 may be or may not be a terminal with a full screen design. FIG. 1 illustrates the mobile terminal 100 by using a full screen design. The full screen refers to a design that all area (or most of the area) except a bezel 180 on a front panel is provided with the display screen 120.

The first area 140 is formed on the display screen 120. The first area 140 may be a hole area or a light transmitting area. When the first area 140 is a hole area, the ambient light sensor 160 is disposed in the first area 140 or below the first area 140. When the first area 140 is a light transmitting area, the ambient light sensor 160 is disposed below the light transmitting area.

Figure 2:
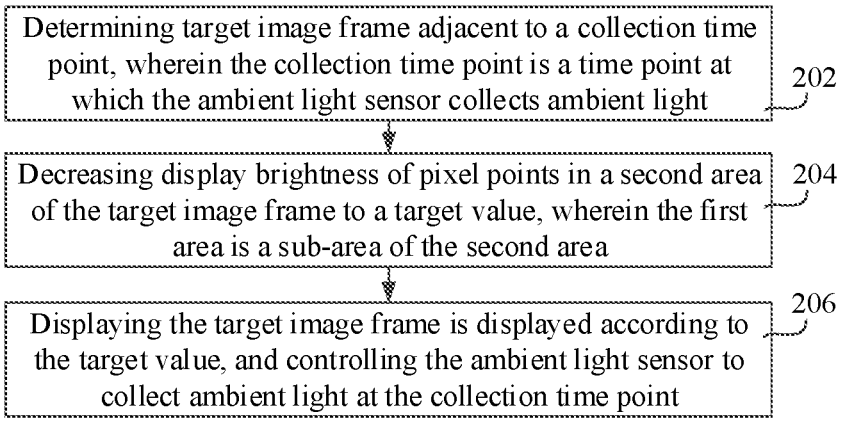
FIG. 2 is a flowchart showing an ambient light collecting method according to some embodiments.

FIG. 2 is a flowchart of an ambient light collecting method according to some embodiments of the present application. The method may be applied to a terminal provided with an ambient light sensor. The ambient light sensor is disposed in a first area of a display screen of the terminal. The method may include the following steps.

In step 202, a target image frame adjacent to a collection time point is determined. The collection time point is a time point at which the ambient light sensor collects ambient light.

The display screen displays an image frame at a certain frequency, such as displaying 60 frames per second. When the i-th frame image frame and the i+1th frame image frame are displayed, there is a display interval between the two frames, where i is a positive integer.

The collection time point is the time at which the ambient light sensor collects ambient light. When the image frame is displayed on the display screen, it will affect the ambient light sensor to collect ambient light. As an example, the collection time point is provided in a display interval between two adjacent image frames (the i-th frame image frame and the i-th frame image frame).

The terminal determines at least one image frame adjacent to the collection time point as the target image frame.

In step 204, display brightness of pixel points in a second area of the target image frame is decreased to a target value. The first area is a sub-area of the second area.

The second area is an area on the target image frame that covers (or partially covers) the first area. That is, the first area is a sub-area of the second area.

The terminal decreases the display brightness of the pixel points in the second area of the target image frame to a target value. The target value is a preset value or a dynamically determined value.

In step 206, the target image frame is displayed according to the target value, and the ambient light sensor is controlled to collect ambient light at the collection time point.

The terminal displays the target image frame at a certain frequency, and controls the ambient light sensor to collect ambient light at the collection time point.

The order of the time of displaying the target image frame and the collection time point is not limited. The time of displaying the target image frame may be located before the collection time point, or may be located after the collection time point, or may be located before and after the collection time point.

As such, in the methods provided in these embodiments, by determining a target image frame adjacent to a collection time point and decreasing display brightness of pixel points in a second area of the target image frame to a target value, the display brightness of the pixel points in the second area can be decreased as much as possible, thereby reducing or eliminating the influence of the display light emitted by the pixel points in the second area on the ambient light sensor when collecting ambient light.

Figure 3:
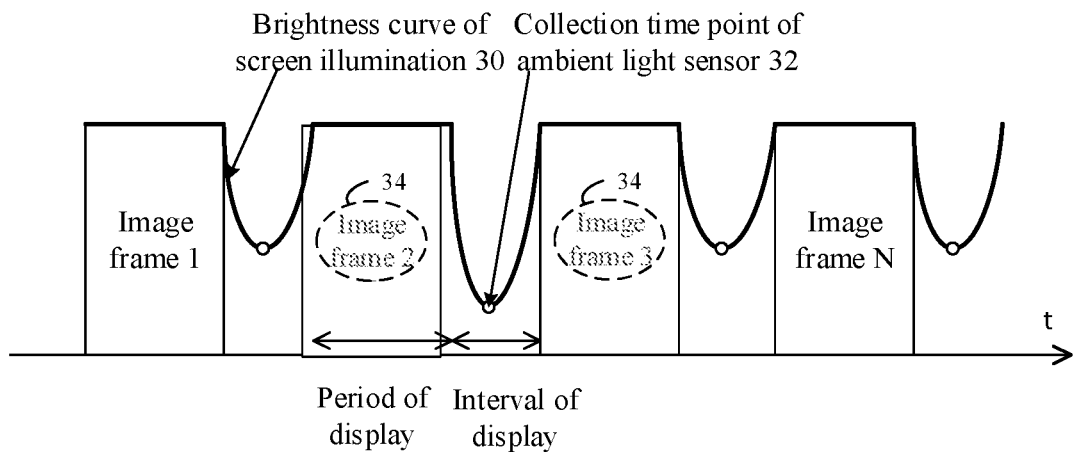
FIG. 3 is a schematic diagram showing the principle of an ambient light collecting method according to some embodiments.

Referring to FIG. 3, according to a screen illumination brightness curve 30, when an image frame is displayed, the screen illumination brightness is high; and in the middle of the display interval between two image frames, the screen illumination brightness is lowered. A collection time point 32 of the ambient light sensor is provided in a display interval between two adjacent image frames (an image frame 2 and an image frame 3).

The terminal determines the image frame 2 and the image frame 3 as target image frames adjacent to the collection time point 32. For pixel points in a second area 34 on the image frame 2 and the image frame 3, the terminal can decrease the display brightness of these pixel points to the target value. In this way, the illumination brightness of the pixel points in the second area 34 is lowered, and the screen illumination brightness at the collection time point 32 is lower than the screen illumination brightness in a display interval between other image frames (such as the screen illumination brightness between an image frame 1 and the image frame 2).

In some embodiments, as illustrated in FIG. 2 for an example, the terminal may determine a target image frame adjacent to a collection time point in at least one of the following manners.

First, a previous frame adjacent to the collection time point is determined as the target image frame.

Figure 4:
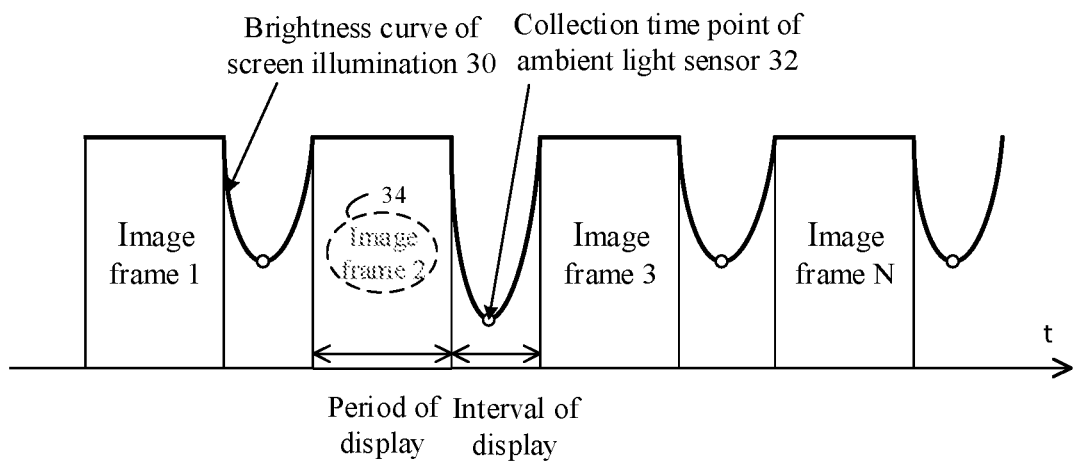
FIG. 4 is a schematic diagram showing the principle of an ambient light collecting method according to another exemplary embodiment.

As shown in FIG. 4, the previous frame (the image frame 2) adjacent to the collection time point may be determined as the target image frame.

Second, the previous frame and a subsequent frame adjacent to the collection time point are determined as target image frames.

Third, the first n frames adjacent to the collection time point are determined as target image frames.

N is an integer greater than 1. For example, the first 2 frames adjacent to the collection time point are determined as target image frames, or the first 5 frames adjacent to the collection time point are determined as target image frames.

Fourth, the first n frames and the last m frames adjacent to the collection time point are determined as target image frames.

N and m are integers greater than 1. For example, the preceding 2 frames and the subsequent 2 frames adjacent to the collection time point are determined as target image frames, or the preceding 3 frames and the subsequent frame adjacent to the collection time point are determined as target image frames.

When there are few target image frames, the amount of calculation required by the terminal can be reduced. When there are many target image frames, the influence of the screen illumination on the ambient light can be better reduced. The terminal can determine the target image frame in any one of the above four manners according to its own hardware performance or usage scenario.

In some embodiments, as illustrated in FIG. 2 for an example, the foregoing step 202 may be implemented in at least one of the following implementation manners:

The first manner: a preset manner;

The terminal acquires a preset first target value; and determines the display brightness of the pixel points in the second area of the target image frame as the first target value.

The first target value is a static value set when leaving the factory, or set by server update, or manually set by a user.

The second manner: dynamic adjustment based on the time period;

The terminal acquires a time period corresponding to the current time;

determines a second target value corresponding to the time period; and determines the display brightness of the pixel points in the second area of the target image frame as the second target value.

The terminal can invoke a time interface in the operating system to acquire time in the operating system.

In an example, the terminal stores a first corresponding relationship between the time period and the second target value. For example, a second target value of the daytime period is higher than a second target value of the nighttime period. The terminal dynamically determines the second target value according to the time period in which the current time is located.

Table 1 schematically shows the first corresponding relationship.

TABLE 1

| Time period | Second target value |
| --- | --- |
| 8:00 am to 3:00 pm | Brightness 1 |
| 3:00 pm to 8:00 pm | Brightness 2 |
| 8:00 pm to 8:00 am | Brightness 3 |

The third manner: dynamical adjustment based on the display type;

The terminal determines a display type of the target image frame, which can include any one of a user interface, a video frame, or an electronic document; determines a third target value corresponding to the display type; and determines the display brightness of the pixel points in the second area of the target image frame as the third target value.

The terminal can invoke a task stack in the operating system to determine a display type of the front-end user interface according to the task stack.

For example, because the user interface and the electronic document can be less sensitive to display brightness, the third target value can be as low as possible. As the video frame can be more sensitive to display brightness, the third target value can be slightly higher.

Table 2 schematically shows the second corresponding relationship.

TABLE 2

| Time period | Second target value |
| --- | --- |
| User interface | Brightness 1 |
| Video frame | Brightness 2 |
| Electronic document | Brightness 3 |

The fourth manner: dynamical adjustment based on the hue type;

The terminal determines a hue type of the target image frame; determines a fourth target value corresponding to the hue type; and determines the display brightness of the pixel points in the second area of the target image frame as the fourth target value.

The terminal may calculate an overall average color value of the target image frame, and determine a hue type of the target image frame according to the overall average color value. For a dark hue type, a relatively lower fourth target value (dark) is determined. For a light hue type, a relatively higher fourth target value (bright) is determined.

As such, the methods according to some embodiments of the present disclosure can provide a better balance between improving the ambient light collection accuracy and ensuring a better display effect by dynamically determining the target value.

In some embodiments based on FIG. 2, the shape and size of the second area described above are not limited. The second area may be a statically invariable area or a dynamically changed area.

In an example, when the second area is a statically invariable area, the terminal determines the shape of a preset area as the shape of the second area. The preset area includes at least one of a rectangle, a square, a circle, or a hexagon.

Illustratively, when the second area is a dynamically changed area, the terminal determines a shape of a display element that has an intersection with the first area of the target image frame. The display element can include at least one of a control element, a moving object, a character, or a pattern. The display element is determined as the shape of the second area. For example, if the image frame is a user interface, the position of the control element (such as a button) at the first area is determined as the second area. As another example, the image frame is a video frame, and a bird in the video frame is located in the first area, then the bird-shaped area where the bird is located is determined as the second area. In this way, a better display effect can be retained.

Figure 5:
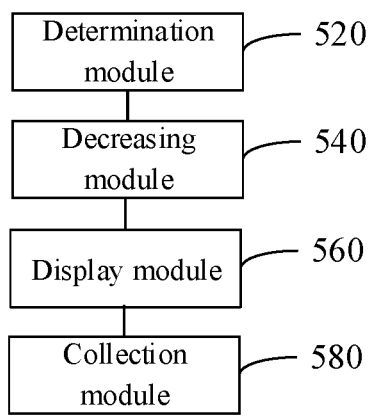
FIG. 5 is a block diagram of an ambient light collecting apparatus according to some embodiments.

FIG. 5 shows a block diagram of an ambient light collecting apparatus shown in some embodiments of the present disclosure. In a terminal provided with an ambient light sensor, the ambient light sensor is disposed in a first area in a display screen of the terminal. The apparatus includes:

a determination module 520 configured to determine a target image frame adjacent to a collection time point, where the collection time point is a time point when the ambient light sensor collects ambient light;

a decreasing module 540 configured to decrease display brightness of pixel points in a second area of the target image frame to a target value; where the first area is a sub-area of the second area;

a display module 560 configured to display the target image frame according to the target value; and a collection module 580 configured to control the ambient light sensor to collect the ambient light at the collection time point.

The various device components, portions, blocks, or portions may have modular configurations, or are composed of discrete components, but nonetheless can be referred to as "portions" in general. In other words, the "components," "portions," "blocks," "portions," or "portions" referred to herein may or may not be in modular forms.

In some embodiments, the decreasing module 540 is configured to acquire a preset first target value, and to determine the display brightness of the pixel points in the second area of the target image frame as the first target value.

In some embodiments, the decreasing module 540 is configured to acquire a time period corresponding to the current time, to determine a second target value corresponding to the time period, and to determine the display brightness of the pixel points in the second area of the target image frame as the second target value.

In some embodiments, the decreasing module 540 is configured to determine a display type of the target image frame, which can include at least one of a user interface, a video frame, or an electronic document; to determine a third target value corresponding to the display type; and to determine the display brightness of the pixel points in the second area of the target image frame as the third target value.

In some embodiments, the decreasing module 540 is configured to determine a hue type of the target image frame; to determine a fourth target value corresponding to the hue type; and to determine the display brightness of the pixel points in the second area of the target image frame as the fourth target value.

In some embodiments, the determination module 520 is configured to determine a previous frame adjacent to the collection time point as the target image frame; or the determination module 520 is configured to determine the previous frame and a subsequent frame adjacent to the collection time point as the target image frames; or the determination module 520 is configured to determine the preceding frames adjacent to the collection time point as the target image frames, where n is an integer greater than 1; or the determination module 520 is configured to determine the preceding n frames and the subsequent m frames adjacent to the collection time point as the target image frames, where n and m are integers greater than 1.

In some embodiments, the collection time point is located in a display interval of two adjacent image frames.

In some embodiments, the determination module 520 is further configured to determine a shape of a preset area as the shape of the second area, where the preset area can include at least one of a rectangle, a square, a circle, or a hexagon.

In some embodiments, the determination module 520 is further configured to determine a shape of a display element of the target image frame that has an intersection with the first area, where the display element can include at least one of a control element, a moving object, a character, or a pattern; and to determine the display element as the shape of the second area.

Figure 6:
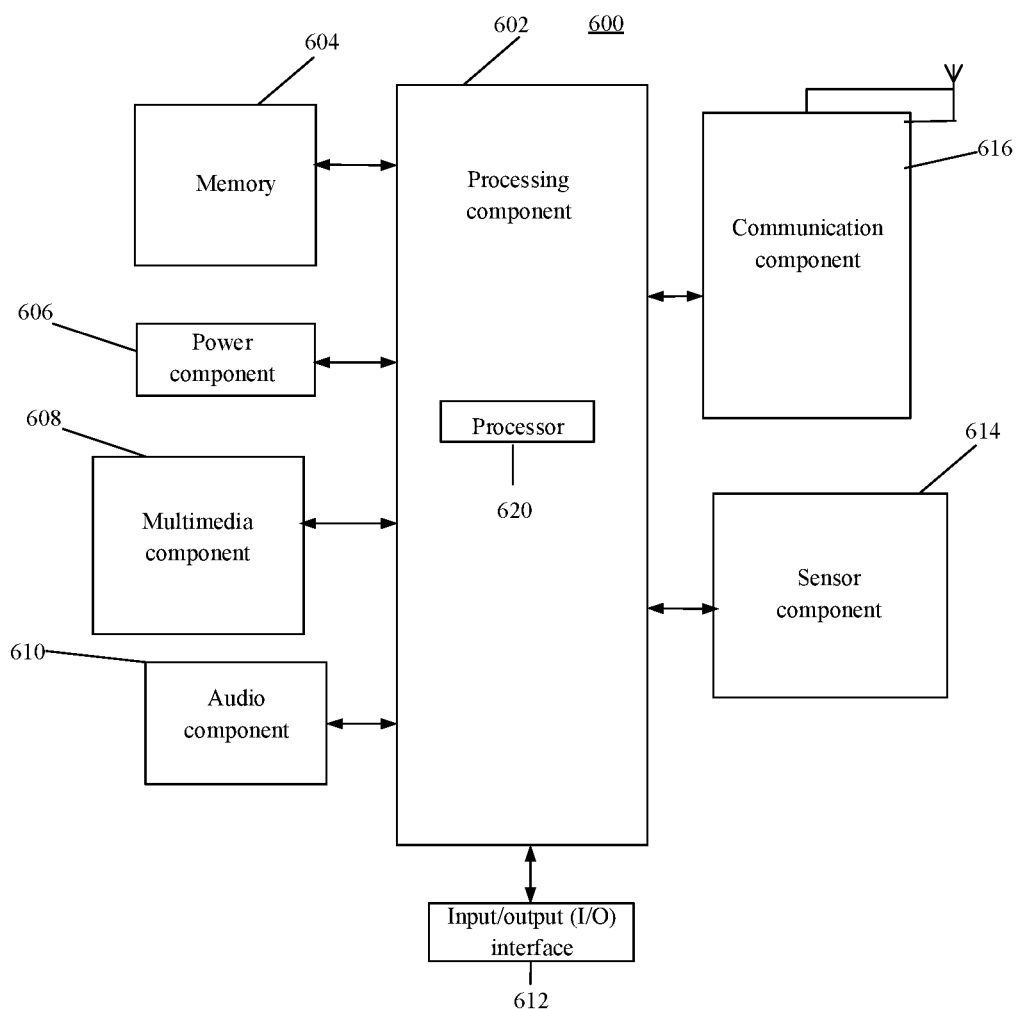
FIG. 6 is a block diagram of a mobile terminal according to some embodiments.

FIG. 6 is a block diagram of an ambient light collecting apparatus 600 in accordance with some embodiments. For example, the apparatus 600 may be a mobile phone, a computer, a digital broadcast terminal, a messaging device, a gaming console, a tablet device, a medical device, a fitness equipment, a personal digital assistant, and the like.

Referring to FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operations of the apparatus 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, videos, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or more power sources, and any other components associated with the generation, management, and distribution of power in the apparatus 600.

The multimedia component 608 includes a screen providing an output interface between the apparatus 600 and the user. In some embodiments, the screen may include a liquid crystal display (LCD) and a touch panel (TP). In some embodiments, an organic light-emitting diode (OLED) display or other types of displays can be adopted If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 608 includes a front camera and/or a rear camera. The front camera and the rear camera may receive external multimedia data while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive external audio signals when the apparatus 600 is in an operation mode, such as a call mode, a recording mode, and a voice recognition mode. The received audio signal may be further stored in the memory 604 or transmitted via the communication component 616. In some embodiments, the audio component 610 further includes a speaker for outputting audio signals.

The I/O interface 612 provides an interface between the processing component 602 and peripheral interface modules, such as a keyboard, a click wheel, buttons, and the like. The buttons may include, but are not limited to, a home button, a volume button, a start button, and a lock button.

The sensor component 614 includes one or more sensors to provide status assessments of various aspects of the apparatus 600. For instance, the sensor component 614 may detect an on/off status of the apparatus 600, relative positioning of components, e.g., the display device and the mini keyboard of the apparatus 600, and the sensor component 614 may also detect a position change of the apparatus 600 or a component of the apparatus 600, presence or absence of user contact with the apparatus 600, orientation or acceleration/deceleration of the apparatus 600, and temperature change of the apparatus 600. The sensor component 614 may include a proximity sensor configured to detect the presence of nearby objects without any physical contact. The sensor component 614 may also include a light sensor, such as a CMOS or CCD image sensor, used for imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the apparatus 600 and other devices. The apparatus 600 can access a wireless network based on a communication standard, such as Wi-Fi, 2G, 3G, 4G, or 5G, or a combination thereof. In some embodiments, the communication component 616 receives broadcast signals or broadcast associated information from an external broadcast management system via a broadcast channel. In some embodiments, the communication component 616 further includes a near field communication (NFC) module to facilitate short-range communications.

In some embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer-readable storage medium including instructions is also provided, such as the memory 604 including instructions, executable by the processor 620 in the apparatus 600, for performing the above-described methods. For example, the non-transitory computer-readable storage medium may be a ROM, a RAM, a CD-ROM, a magnetic tape, a floppy disc, an optical data storage device, and the like.

In some embodiments, there is provided an ambient light collecting method, applied to a terminal provided with an ambient light sensor, the said ambient light sensor being disposed in a first area in a display screen of the terminal. The method comprises:

determining a target image frame adjacent to a collection time point, wherein the collection time point is a time point at which the ambient light sensor collects ambient light;

decreasing display brightness of pixel points in a second area of the target image frame to a target value, wherein the first area is a sub-area of the second area; and displaying the target image frame according to the target value, and controlling the ambient light sensor to collect the ambient light at the collection time point.

In some embodiments, decreasing display brightness of pixel points in a second area of the target image frame to a target value comprises:

obtaining a preset first target value; and
determining the display brightness of the pixel points in the second area of the target image frame as the first target value.

In some embodiments, decreasing display brightness of pixel points in a second area of the target image frame to a target value comprises:

obtaining a time period corresponding to the current time;
determining a second target value corresponding to the time period; and
determining the display brightness of the pixel points in the second area of the target image frame as the second target value.

In some embodiments, decreasing display brightness of pixel points in a second area of the target image frame to a target value comprises:

determining a display type of the target image frame, which comprises any one of a user interface, a video frame, and an electronic document;
determining a third target value corresponding to the display type; and
determining the display brightness of the pixel points in the second area of the target image frame as the third target value.

In some embodiments, decreasing display brightness of pixel points in a second area of the target image frame to a target value comprises:

determining a hue type of the target image frame;
determining a fourth target value corresponding to the hue type; and
determining the display brightness of the pixel points in the second area of the target image frame as the fourth target value.

In some embodiments, determining a target image frame adjacent to a collection time point comprises:

determining a previous frame adjacent to the collection time point as the target image frame;

or, determining the previous frame and a subsequent frame adjacent to the collection time point as the target image frames;

or, determining first n frames adjacent to the collection time point as the target image frames, where n is an integer greater than 1;

or, determining the first n frames and the last m frames adjacent to the collection time point as the target image frames, where n and m are integers greater than 1.

In some embodiments, the collection time point is located in a display interval of two adjacent image frames.

In some embodiments, the method further comprises:
determining a shape of a preset area as a shape of the second area, wherein the preset area comprises at least one of a rectangle, a square, a circle, or a hexagon.

In some embodiments, the method further comprises:
determining, in the target image frame, a shape of a display element that intersects with the first area, wherein the display element can be at least one of a control element, a moving object, a character, or a pattern; and
determining the display element as the shape of the second area.

In some other embodiments, there is provided an ambient light collecting apparatus, applied to a terminal provided with an ambient light sensor, the said ambient light sensor being disposed in a first area in a display screen of the terminal, the said apparatus comprises:

a determination module configured to determine a target image frame adjacent to a collection time point, wherein the collection time point is a time point at which the ambient light sensor collects ambient light;

a decreasing module configured to decrease display brightness of pixel points in a second area of the target image frame to a target value, wherein the first area is a sub-area of the second area;

a display module configured to display the target image frame according to the target value; and a collection module configured to control the ambient light sensor to collect the ambient light at the collection time point.

In some embodiments, the decreasing module is configured to acquire a preset first target value; and to determine the display brightness of the pixel points in the second area of the target image frame as the first target value.

In some embodiments, the decreasing module is configured to acquire a time period corresponding to the current time, to determine a second target value corresponding to the time period, and to determine the display brightness of the pixel points in the second area of the target image frame as the second target value.

In some embodiments, the decreasing module is configured to determine a display type of the target image frame, wherein the display type comprises any one of a user interface, a video frame, and an electronic document; to determine a third target value corresponding to the display type; and to determine the display brightness of the pixel points in the second area of the target image frame as the third target value.

In some embodiments, the decreasing module is configured to determine a hue type of the target image frame; to determine a fourth target value corresponding to the hue type; and to determine the display brightness of the pixel points in the second area of the target image frame as the fourth target value.

In some embodiments, the determination module is configured to determine a previous frame adjacent to the collection time point as the target image frame;

or, the determination module is configured to determine the previous frame and a subsequent frame adjacent to the collection time point as the target image frames;

or, the determination module is configured to determine first n frames adjacent to the collection time point as the target image frames, where n is an integer greater than 1;

or, the determination module is configured to determine the first n frames and the last m frames adjacent to the collection time point as the target image frames, where n and m are integers greater than 1.

In some embodiments, the collection time point is located in a display interval of two adjacent image frames.

In some embodiments, the determination module is further configured to determine a shape of a preset area as a shape of the second area, wherein the preset area comprises at least one of a rectangle, a square, a circle, or a hexagon.

In some embodiments, the determination module is further configured to determine a shape of a display element that intersects with the first area of the target image frame, wherein the display element can be at least one of a control element, a moving object, a character, or a pattern; and to determine the display element as the shape of the second area.

In some other embodiments, there is provided a terminal, comprising: a processor and a memory, wherein a computer program is stored in the memory, and the processor executes the computer program to implement the ambient light collecting method in any of the above embodiments.

In some embodiments, there is provided a computer readable storage medium, wherein the computer readable storage medium stores a computer program, the computer program being executed by a processor to implement the ambient light collecting method in the above embodiments.

Various embodiments of the present disclosure can have one or more of the following advantages.

By determining a target image frame adjacent to a collection time point and decreasing display brightness of pixel points in a second area of the target image frame to a target value, the display brightness of the pixel points in the second area can be decreased as much as possible, thereby reducing or eliminating the influence of the display light emitted by the pixel points in the second area on the ambient light sensor when collecting ambient light.

It is to be understood that the term "plurality" herein refers to two or more. "And/or" herein describes the correspondence of the corresponding objects, indicating three kinds of relationship. For example, A and/or B, can be expressed as: A exists alone, A and B exist concurrently, B exists alone. The character "/" generally indicates that the context object is an "OR" relationship.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the description of the present disclosure, the terms "one embodiment," "implementation," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method of collecting ambient light, applied to a terminal provided with an ambient light sensor at a first area in a display screen of the terminal, the method comprising:
   determining a target image frame adjacent to a collection time point, wherein the collection time point is a time point at which the ambient light sensor collects ambient light, and the target image frame comprises a previous frame adjacent to the collection time point;

displaying the target image frame, wherein display brightness of pixel points in a second area of the target image frame is a target value, and the target value is a minimum possible value to which the display brightness of the pixel points in the second area is decreased, such that display brightness of the display screen in a display interval between the previous frame and a subsequent frame adjacent to the collection time point is decreased; and controlling, after displaying the target image frame, the ambient light sensor to collect the ambient light at the collection time point, wherein the collection time point is located in the display interval, thereby reducing or eliminating influence of display light emitted by the pixel points in the second area on the ambient light sensor when collecting the ambient light.

2. The method according to claim 1, wherein the decreasing display brightness of pixel points in a second area of the target image frame to a target value comprises:

invoking, by the terminal, a time interface in an operating system to acquire time in the operating system, and assigning the time in the operating system as the current time of the terminal;

obtaining a time period corresponding to the current time of the terminal;

determining a second target value corresponding to the time period; and determining the display brightness of the pixel points in the second area of the target image frame as the second target value.

3. The method according to claim 1, wherein the decreasing display brightness of pixel points in a second area of the target image frame to a target value comprises:

invoking, by the terminal, a task stack in an operating system;

determining, according to the task stack, a display type of the target image frame which comprises at least one of a user interface, a video frame, or an electronic document;

determining a third target value corresponding to the display type; and determining the display brightness of the pixel points in the second area of the target image frame as the third target value.

4. The method according to claim 1, wherein the decreasing display brightness of pixel points in a second area of the target image frame to a target value comprises:

calculating, by the terminal, an overall average color value of the target image frame;

determining, according to the overall average color value, a hue type of the target image frame;

determining a fourth target value corresponding to the hue type; and determining the display brightness of the pixel points in the second area of the target image frame as the fourth target value.

5. The method according to claim 1, wherein the determining a target image frame adjacent to a collection time point further comprises at least one of:

determining the previous frame and the subsequent frame adjacent to the collection time point as the target image frames;

determining first n frames adjacent to the collection time point as the target image frames, where n is an integer greater than 1; or, determining the first n frames and the last m frames adjacent to the collection time point as the target image frames, where n and m are integers greater than 1.

6. The method according to claim 1, further comprising:

determining a shape of a preset area as a shape of the second area, wherein the preset area comprises at least one of a rectangle, a square, a circle, or a hexagon.

7. The method according to claim 1, further comprising:

determining, in the target image frame, a shape of a display element that intersects with the first area, wherein the display element is one of a control element, a moving object, a character, or a pattern; and determining the display element as the shape of the second area.

8. A mobile phone implementing the method according to claim 1, wherein the mobile phone is configured to decrease the display brightness of the pixel points in the second area to a minimum possible value.

9. The method according to claim 1, wherein the decreasing display brightness of pixel points in a second area of the target image frame to a target value comprises:

obtaining a preset first target value; and determining the display brightness of the pixel points in the second area of the target image frame as the first target value.

10. A terminal, comprising: a processor, memory, and an ambient light sensor at a first area in a display screen of the terminal, wherein a computer program is stored in the memory and is executed by the processor to:

determine a target image frame adjacent to a collection time point, wherein the collection time point is a time point at which the ambient light sensor collects ambient light, and the target image frame comprises a previous frame adjacent to the collection time point;

display the target image frame, wherein display brightness of pixel points in a second area of the target image frame is a target value, and the target value is a minimum possible value to which the display brightness of the pixel points in the second area is decreased, such that display brightness of the display screen in a display interval between the previous frame and a subsequent frame adjacent to the collection time point is decreased; and control, after displaying the target image frame, the ambient light sensor to collect the ambient light at the collection time point, wherein the collection time point is located in the display interval, thereby reducing or eliminating influence of display light emitted by the pixel points in the second area on the ambient light sensor when collecting the ambient light.

11. The terminal according to claim 10, wherein the decreasing display brightness of pixel points in a second area of the target image frame to a target value comprises:

invoking, by the terminal, a time interface in an operating system to acquire time in the operating system, and assigning the time in the operating system as the current time of the terminal;

obtaining a time period corresponding to the current time of the terminal;

determining a second target value corresponding to the time period; and determining the display brightness of the pixel points in the second area of the target image frame as the second target value.

12. The terminal according to claim 10, wherein the decreasing display brightness of pixel points in a second area of the target image frame to a target value comprises:
invoking, by the terminal, a task stack in an operating system;
determining, according to the task stack, a display type of the target image frame, which comprises at least one of a user interface, a video frame, or an electronic document;
determining a third target value corresponding to the display type; and
determining the display brightness of the pixel points in the second area of the target image frame as the third target value.

13. The terminal according to claim 10, wherein the decreasing display brightness of pixel points in a second area of the target image frame to a target value comprises:
calculating, by the terminal, an overall average color value of the target image frame;
determining, according to the overall average color value, a hue type of the target image frame;
determining a fourth target value corresponding to the hue type; and
determining the display brightness of the pixel points in the second area of the target image frame as the fourth target value.

14. The terminal according to claim 10, wherein the determining a target image frame adjacent to a collection time point further comprises at least one of:
determining the previous frame and the subsequent frame adjacent to the collection time point as the target image frames;
determining first n frames adjacent to the collection time point as the target image frames, where n is an integer greater than 1; or,
determining the first n frames and the last m frames adjacent to the collection time point as the target image frames, where n and m are integers greater than 1.

15. The terminal according to claim 10, wherein the computer program is further executed by the processor to:
determine a shape of a preset area as a shape of the second area, wherein the preset area comprises at least one of a rectangle, a square, a circle, or a hexagon.

16. The terminal according to claim 10, wherein the computer program is further executed by the processor to:
determine, in the target image frame, a shape of a display element that intersects with the first area, wherein the display element is one of a control element, a moving object, a character, or a pattern; and
determine the display element as the shape of the second area.

17. The terminal according to claim 10, wherein the decreasing display brightness of pixel points in a second area of the target image frame to a target value comprises:
obtaining a preset first target value; and
determining the display brightness of the pixel points in the second area of the target image frame as the first target value.

18. A non-transitory computer-readable storage medium, wherein
a computer program is stored on the computer readable storage medium and is executed by a processor to:
determine a target image frame adjacent to a collection time point, wherein the collection time point is a time point at which an ambient light sensor collects ambient light, the ambient light sensor being disposed in a first area in a display screen of a terminal, and the target image frame comprises a previous frame adjacent to the collection time point;
display the target image frame, wherein display brightness of pixel points in a second area of the target image frame is a target value, and the target value is a minimum possible value to which the display brightness of the pixel points in the second area is decreased, such that display brightness of the display screen in a display interval between the previous frame and a subsequent frame adjacent to the collection time point is decreased; and
control, after displaying the target image frame, the ambient light sensor to collect the ambient light at the collection time point, wherein the collection time point is located in the display interval,
thereby reducing or eliminating influence of display light emitted by the pixel points in the second area on the ambient light sensor when collecting the ambient light.

* * * * *